US009652022B2

United States Patent
Das et al.

(10) Patent No.: US 9,652,022 B2
(45) Date of Patent: May 16, 2017

(54) SYSTEM AND METHOD FOR PROVIDING DYNAMIC QUALITY OF SERVICE LEVELS BASED ON COPROCESSOR OPERATION

(71) Applicant: QUALCOMM INCORPORATED, San Diego, CA (US)

(72) Inventors: Asutosh Das, Hyderabad (IN); Krishna Vsssr Vanka, Hyderabad (IN); Sravan Kumar Ambapuram, Hyderabad (IN); Sujit Reddy Thumma, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 14/472,295

(22) Filed: Aug. 28, 2014

(65) Prior Publication Data

US 2016/0062438 A1    Mar. 3, 2016

(51) Int. Cl.
*G06F 1/32* (2006.01)

(52) U.S. Cl.
CPC ............ *G06F 1/3206* (2013.01); *G06F 1/324* (2013.01); *G06F 1/3296* (2013.01);
(Continued)

(58) Field of Classification Search
CPC ...... G06F 1/3206; G06F 1/3296; G06F 1/324; Y02B 60/1217; Y02B 60/1285; Y02B 60/32
See application file for complete search history.

(56) References Cited

U.S. PATENT DOCUMENTS 5,784,602 A * 7/1998 Glass .................. G06F 9/30014
                                                          712/220
7,472,301 B2    12/2008 Ginggen et al.
(Continued)

OTHER PUBLICATIONS

Benini L., et al., "Powering Networks on Chips Energy-Efficient and Reliable Interconnect design for SoCs" 11, 14th, International Symposium on System Synthesis, ISSS, Montreal, Canada, Sep. 30-Oct. 3, 2001; [International Symposium on System Synthesis. ISSS], New York, NY : ACM, US, Sep. 30, 2001 (Sep. 30, 2001), pp. 33-38, XP010563556, DOI: 10.1145/500001.500009 ISBN: 978-1-58113-418-6.
(Continued)

*Primary Examiner* — Zahid Choudhury
(74) *Attorney, Agent, or Firm* — Smith Tempel Blaha LLC

(57) ABSTRACT

Systems and methods that allow for dynamic quality of service (QoS) levels for an application processor in a multi-core on-chip system (SoC) in a portable computing device (PCD) are presented. During operation of the PCD an operational load of a co-processor of the SoC is determined, where the co-processor is in communication with an application processor of the SoC. Based on the determined load, the co-processor determines a QoS level required from the application processor. The QoS level is communicated to the application processor. The application processor determines whether it can implement power optimization measures, such as entering into a low power mode (LPM), based at least in part on the dynamically communicated QoS level from the co-processor. The present disclosure provides a cost effective ability to reduce power consumption in PCDs implementing one or more cores or CPUs that are dependent upon the application processor.

19 Claims, 6 Drawing Sheets

(52) U.S. Cl.
CPC ....... *Y02B 60/1217* (2013.01); *Y02B 60/1285* (2013.01); *Y02B 60/32* (2013.01)

(56) References Cited

U.S. PATENT DOCUMENTS

| | | | | |
|---|---|---|---|---|
| 8,051,324 | B1* | 11/2011 | Zhao | G06F 11/3409 |
| | | | | 700/3 |
| 8,327,158 | B2 | 12/2012 | Titiano et al. | |
| 8,364,857 | B2 | 1/2013 | Pyers et al. | |
| 8,493,966 | B2 | 7/2013 | Bendelac | |
| 8,601,145 | B2* | 12/2013 | Mueller | G06F 13/387 |
| | | | | 455/423 |
| 8,924,754 | B2* | 12/2014 | Solihin | G06F 1/3225 |
| | | | | 713/300 |
| 2009/0083557 | A1* | 3/2009 | Ichikawa | G06F 9/5088 |
| | | | | 713/310 |
| 2011/0145617 | A1 | 6/2011 | Thomson et al. | |
| 2013/0151879 | A1 | 6/2013 | Thomson et al. | |
| 2013/0275786 | A1* | 10/2013 | Tanaka | G06F 1/3234 |
| | | | | 713/320 |
| 2014/0101420 | A1* | 4/2014 | Wu | G06F 1/3206 |
| | | | | 713/1 |
| 2015/0033047 | A1* | 1/2015 | Byun | G06F 1/3206 |
| | | | | 713/320 |
| 2015/0033053 | A1* | 1/2015 | Kim | G06F 1/3206 |
| | | | | 713/323 |
| 2015/0169035 | A1* | 6/2015 | Allen-Ware | G06F 1/3234 |
| | | | | 713/322 |

OTHER PUBLICATIONS

International Search Report and Written Opinion—PCT/US2015/046181—ISA/EPO—Nov. 16, 2015.
Simunic T., et al., "Managing Power Consumption in Networks on Chips," IEEE Transactions on Very Large Scale Integration (VLSI) Systems, Jan. 2004, vol. 12 (1), pp. 96-107.

* cited by examiner

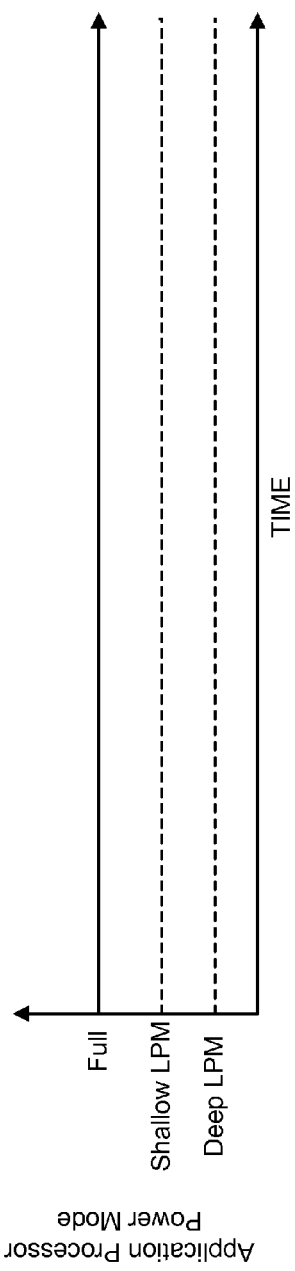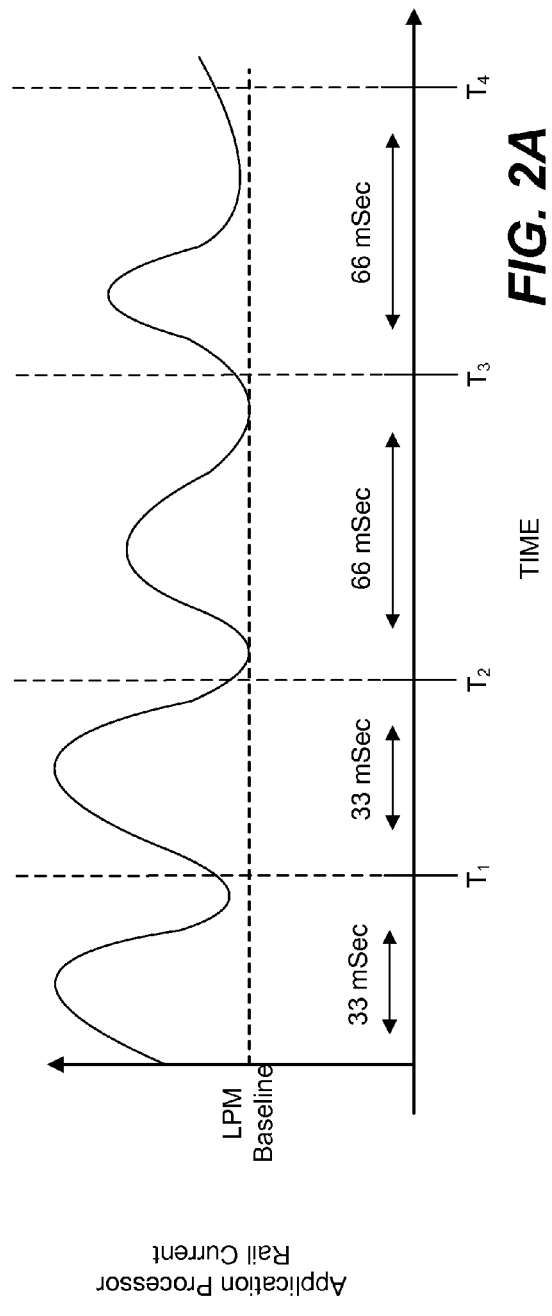

SYSTEM AND METHOD FOR PROVIDING DYNAMIC QUALITY OF SERVICE LEVELS BASED ON COPROCESSOR OPERATION

DESCRIPTION OF THE RELATED ART

Devices with a processor that communicate with other devices through wireless signals, including portable computing devices (PCDs), are ubiquitous. These devices may include mobile telephones, portable digital assistants (PDAs), portable game consoles, palmtop computers, and other portable electronic devices. In addition to the primary function of these devices, many include peripheral functions. For example, a mobile or cellular telephone may include the primary function of enabling and supporting telephone calls and the peripheral functions of a still camera, a video camera, global positioning system (GPS) navigation, web browsing, viewing videos, playing games, sending and receiving emails, sending and receiving text messages, push-to-talk capabilities, etc.

Modern PCDs typically include a system-on-a-chip (SoC) comprising one or more cores (e.g., central processing unit(s) (CPUs), video decoder, graphics processing unit(s) (GPU), modem processor, digital signal processor(s) (DSPs), etc.) for controlling or performing varying functions of the PCD. The presence of an increasing number of cores and/or CPUs can be problematic in the PCD setting as operating each core/CPU increases the power consumption on the PCD, reducing battery life. For example, as the functionality of PCDs increases, multiple cores of the SoC may interact with an application core (or processor) requiring the application core to maintain a high level of operation or quality of service (QoS) and preventing the application core from entering low power modes that reducing current and power consumption.

In an effort to reduce power consumption, CPUs including an application core or CPU may implement some form of Dynamic Clock and Voltage Scaling (DCVS) algorithm to minimize power consumption. However such DCVS algorithms typically operate based on the CPU's own load computed periodically in order to determine the best frequency and/or current level for the CPU. One problem with these kinds of SoCs and DCVS algorithms is that they fail to consider or take into account any dynamic QoS needs of any co-processors that depend on the application core. This can result in the application core failing to enter a lower power mode for periods of time where a co-processor may be operating, but does not need a high level of QoS from the application core at that time. This unnecessarily increases the power consumption of the application core, which can be especially problematic for PCDs, such as a mobile phone, running on a battery.

Thus, there is a need for improved systems and methods to allow application cores or other cores providing QoS to co-processors to dynamically enter low power modes when the co-processors are themselves operating at lower frequencies and/or need less QoS from the application core.

SUMMARY OF THE DISCLOSURE

Systems and methods that allow for dynamic quality of service (QoS) levels for an application processor in a multi-core on-chip system (SoC) in a portable computing device (PCD) are disclosed. During operation of the PCD an operational load of a co-processor of the SoC is determined, where the co-processor is in communication with an application processor of the SoC. Based on the determined load, the co-processor determines a QoS level required from the application processor. The QoS level is communicated to the application processor. The application processor determines whether it can implement power optimization measures based at least in part on the dynamically communicated QoS level from the co-processor.

One example embodiment is a PCD with multi-core on-chip system (SoC), the system comprising a co-processor of the SoC where the co-processor including a quality of service (QoS) module. The QoS module of the co-processor is configured to determine an operational load of the co-processor and determine a QoS level required by the co-processor based on the determined operational load. The QoS level is communicated to an application processor in communication with the co-processor. The application processor includes a QoS driver that is configured to determine a power optimization measure for the application processor based on the communicated QoS level from the co-processor.

Another example embodiment is a computer program product comprising a non-transitory computer usable medium having a computer readable program code embodied therein, said computer readable program code adapted to be executed to implement a method for providing dynamic quality of service levels for an application processor in a multi-core on-chip system (SoC) in a portable computing device (PCD), the method comprising: determining an operational load of a co-processor of the SoC, where the co-processor is in communication with the application processor; determining a quality of service (QoS) level required by the co-processor based on the determined operational load; communicating the QoS level to the application processor; and determining a power optimization measure for the application processor based on the communicated QoS level.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 2A is a graph illustrating an exemplary theoretical operation of a co-processor over a period of time that is supported by an application processor that may be implemented in the PCD embodiment illustrated in FIG. 1;

FIG. 2B is a graph illustrating an exemplary power mode of the application processor during the theoretical load illustrated in FIG. 2A;

DETAILED DESCRIPTION

Figure 1:
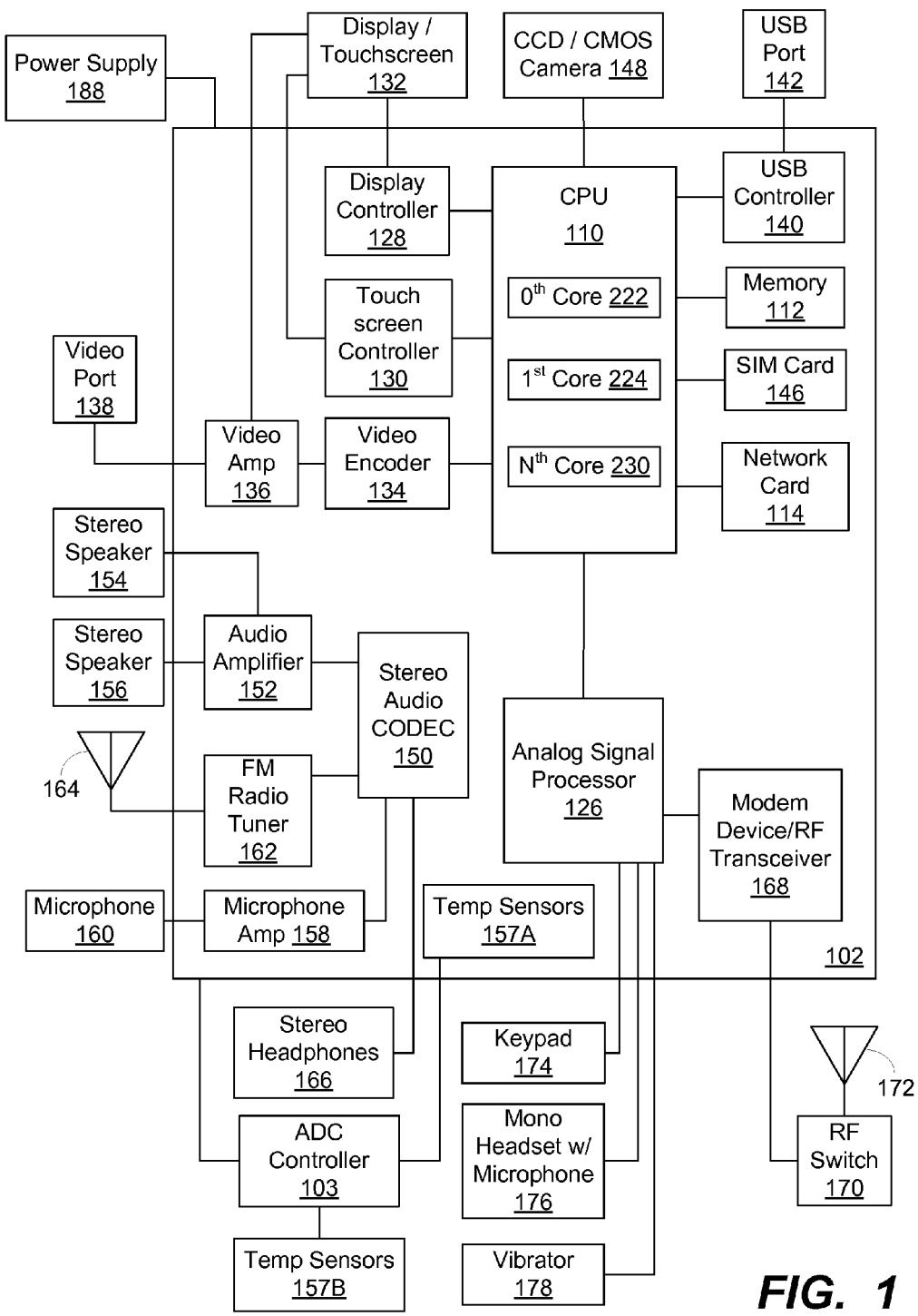
FIG. 1 is a block diagram of an example embodiment of a portable computing device (PCD) in which the present invention may be implemented.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files or data values that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "portable computing device" ("PCD") is used to describe any device operating on a limited capacity rechargeable power source, such as a battery and/or capacitor. Although PCDs with rechargeable power sources have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop or tablet computer with a wireless connection, among others.

In this description, the terms "central processing unit ("CPU")," "digital signal processor ("DSP")," "graphics processing unit ("GPU")," "chip," "video codec," "system bus," "image processor," and "media display processor ("MDP")" are non-limiting examples of processing components that are controllable through dynamic clock and voltage scaling ("DCVS") techniques, and which may benefit from the present systems and methods. These terms for processing components are used interchangeably except when otherwise indicated. Moreover, as discussed below, any of the above or their equivalents may be implemented in, or comprised of, one or more distinct processing components generally referred to herein as "core(s)" and/or "sub-core(s)."

In this description, the terms "workload," "process load," "process workload," and "graphical workload" are used interchangeably and generally directed toward the processing burden, or percentage of processing burden, that is associated with, or may be assigned to, a given processing component in a given embodiment. Additionally, the related terms "frame," "code block" and "block of code" are used interchangeably to refer to a portion or segment of a given workload. For instance, a graphical workload may be comprised of a series of frames, as would be understood by one of ordinary skill in the art of video processing. Further to that which is defined above, a "processing component" or the like may be, but is not limited to being, a central processing unit, a graphical processing unit, a core, a main core, a sub-core, a processing area, a hardware engine, etc. or any component residing within, or external to, an integrated circuit within a portable computing device.

One of ordinary skill in the art will recognize that the term "MIPS" represents the number of millions of instructions per second a processor is able to process at a given power frequency. In this description, the term is used as a general unit of measure to indicate relative levels of processor performance in the exemplary embodiments and will not be construed to suggest that any given embodiment falling within the scope of this disclosure must, or must not, include a processor having any specific Dhrystone rating or processing capacity. Additionally, as would be understood by one of ordinary skill in the art, a processor's MIPS setting directly correlates with the power, frequency, or operating frequency, being supplied to the processor.

The present systems and methods for dynamic quality of service levels based on coprocessor operation in a PCD provide a cost effective ability to dynamically and adaptively determine whether to allow a core, processor (CPU), or processing component running applications ("the application processor") to enter into a lower power mode based on the current operation and quality of service (QoS) needs of another core, processing unit (CPU), peripheral, or processing component (the "co-processor") that depends on the application processor.

In the present systems and methods, the application processor does not just continue to apply an initial QoS restriction that may be placed upon the application processor by a co-processor in communication with the application processor. Instead, during operation, the co-processor periodically determines its own operational load and/or operational frequency based on the present tasks being performed by the co-processor. The co-processor also determines a present QoS level that the co-processor needs from the application processor in order for the co-processor to maintain its own operational load and/or frequency. This QoS level may depend on or take into account a variety of factors, including the load on the co-processor, latency requirements of the applications or tasks the co-processor is operating, thermal conditions of the co-processor, etc.

The QoS level requirement is communicated to the application processor, such as by communicating a QoS value that translates to, or equates to a minimum operational frequency or rail current of the application processor needed by the co-processor. The application processor determines, based at least in part on the communicated QoS level, whether the application processor can implement power optimization measures, such as entering into a low or lower power mode (LPM) or state, or shifting to low bandwidth cores dynamically when operating in a multi-core or heterogeneous environment. The present systems and methods allow for reduced power consumption and improved battery life in PCDs with multiple cores or multi-CPUs implementing one or more application cores.

One example embodiment is a PCD with multi-core on-chip system (SoC), the system comprising a co-processor of the SoC where the co-processor includes a quality of service (QoS) module. The QoS module of the co-processor is configured to determine an operational load of the co-processor based and determine a QoS level required by the co-processor based on the determined operational load. The QoS level is communicated to an application processor in communication with the co-processor. The application processor includes a QoS driver that is configured to determine one or more power optimization measures, for the application processor, such a low power mode (LPM), based on the communicated QoS level from the co-processor.

This ability to dynamically determine quality of service levels based on co-processor operation allows for improved power management of the PCD's processing components. One exemplary advantage is the ability to allow the application processor to go into a low or lower power mode or state during a period of time when a co-processor with QoS needs is itself operating at a lower power/frequency level. In such circumstances the co-processor's present needs may not require the application processor to operate at a high level, which can allow the application processor to enter a lower power mode that would otherwise be prevented by initial QoS restrictions placed by the co-processor. The application processor can take this lessened QoS requirement from the co-processor into consideration along with any other desired factors (such as QoS level messages from additional co-processors, the application processor's own operational load, architecture, etc.) and determine whether the application processor can optimize power, such as by entering into a power-saving mode or state. In this manner, the present systems and methods can avoid significant and often unnecessary power consumption from the application processor.

Although described with particular reference to operation within a PCD, the described systems and methods are applicable to any system with a processor, or processing subsystem where it is desirable to conserve power consumption, enhance performance, or improve quality of service. Stated another way, the described systems and methods may be implemented to provide dynamic quality of service levels based on co-processor operation in a system other than in a portable device.

The system for dynamic quality of service levels based on co-processor operation described herein, or portions of the system, may be implemented in hardware or software. If implemented in hardware, the devices can include any, or a combination of, the following technologies, which are all well known in the art: discrete electronic components, an integrated circuit, an application-specific integrated circuit having appropriately configured semiconductor devices and resistive elements, etc. Any of these hardware devices, whether acting or alone, with other devices, or other components such as a memory may also form or comprise components or means for performing various operations or steps of the disclosed methods, including the steps or blocks illustrated in FIGS. 5A and 5B.

When a PCD or other system described herein is implemented, or partially implemented, in software, the software portion can be used to determine an operational load of a co-processor of the SoC, determine a quality of service (QoS) level required by the co-processor based on the determined operational load, communicate the QoS level to the application processor, and determine a low power mode (LPM) for the application processor based on the communicated QoS level.

The software and data used in representing various elements can be stored in a memory and executed by a suitable instruction execution system (microprocessor). The software may comprise an ordered listing of executable instructions for implementing logical functions, and can be embodied in any "processor-readable medium" for use by or in connection with an instruction execution system, apparatus, or device, such as a single or multiple-core processor or processor-containing system. Such systems will generally access the instructions from the instruction execution system, apparatus, or device and execute the instructions.

FIG. 1 is a block diagram of an exemplary, non-limiting aspect of a PCD 100 that may implement the present systems and methods in the form of a wireless telephone capable of communicating with one or more wireless communication system. Such wireless communication system may be a broadband wireless communication system, including a Long Term Evolution (LTE) system, a Code Division Multiple Access (CDMA) system, a Frequency Division Multiple Access (FDMA) system, a Global System for Mobile Communications (GSM) system, a wireless local area network (WLAN) system, some other wireless system, or a combination of any of these. A CDMA system may implement Wideband CDMA (WCDMA), CDMA 1×, Evolution-Data Optimized (EVDO), Time Division Synchronous CDMA (TDSCDMA), or some other version of CDMA.

As shown, the PCD 100 includes an on-chip system or system-on-a-chip (SoC) 102 that includes a heterogeneous multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 222, 224, 230 may process workloads at different efficiencies under similar operating conditions.

Each of the cores 222, 224, 230 may control one or more function of the PCD 100. For example, the first core 224 may be a graphics processing unit (GPU) for controlling graphics in the PCD 100. Such GPU/first core 224 may further include drivers and/or other components necessary to control the graphics in the PCD 100, including controlling communications between the GPU core 326 and memory 112 (including buffers). For another example, a different core such as the Nth core 230 may control the camera 148 and such core 230 may further include drivers and/or other components necessary to control the camera 148, including communications between the core 230 and memory 112 (including buffers). Similarly, the zeroth core 222 may be an application core running the PCD 100 operating system and/or other applications needed for the desired operation of the PCD 100. Such zeroth core 222 may further include drivers, hardware, interfaces, and/or other components necessary to run the applications, including communications between the zeroth core 222 and the other cores 224, 230 and/or between the zeroth core 222 and additional memories.

As illustrated in FIG. 1, a display controller 128 and a touch screen controller 130 are coupled to the multicore CPU 110. In turn, a display/touchscreen 132, external to the on-chip system 102, is coupled to the display controller 128 and the touch screen controller 130.

The PCD 100 of FIG. 1 may further include a video encoder 134, e.g., a phase alternating line (PAL) encoder, a sequential couleur a memoire (SECAM) encoder, or a national television system(s) committee (NTSC) encoder, or any other type of video decoder 134 coupled to the multicore CPU 110. Further, a video amplifier 136 is coupled to the video encoder 134 and the display/touchscreen 132. A video port 138 is coupled to the video amplifier 136. As depicted in FIG. 1, a universal serial bus (USB) controller 140 is coupled to the multicore CPU 110. Also, a USB port 142 is coupled to the USB controller 140. A memory 112 and a subscriber identity module (SIM) card 146 may also be coupled to the multicore CPU 110. In other embodiments, multiple SIM cards 146 may be implemented.

A digital camera 148 may be coupled to the multicore CPU 110. As discussed above, in such embodiments, the digital camera 148 may be controlled by one of the cores of the multicore CPU 110. In an exemplary aspect, the digital camera 148 is a charge-coupled device (CCD) camera or a complementary metal-oxide semiconductor (CMOS) camera.

As further illustrated in FIG. 1, a stereo audio CODEC 150 may be coupled to the multicore CPU 110. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation (FM) radio tuner 162 may be coupled to the stereo audio CODEC 150. Also, a FM antenna 164 is coupled to the FM radio tuner 162. Further, stereo headphones 166 may be coupled to the stereo audio CODEC 150.

FIG. 1 further indicates that a modem device/radio frequency ("RF") transceiver 168 may be coupled to the multicore CPU 110. The modem device 168 may support one or more of the wireless communications protocols, such as GSM, CDMA, W-CDMA, TDSCDMA, LTE, and variations of LTE such as, but not limited to, FDB/LTE and PDD/LTE wireless protocols. Additionally, there may be multiple modem devices 168, and in such embodiments, different modem devices 168 may support come or all of the wireless communication protocols and/or technologies listed above.

In some implementations the modem device 168 may be further comprised of various components, including a separate processor, memory, and/or RF transceiver. In other implementations the modem device 168 may simply be an RF transceiver. Further, the modem device 168 may be incorporated in an integrated circuit. That is, the components comprising the modem device 168 may be a full solution in a chip. Additionally, various components comprising the modem device 168 may also be coupled to the multicore CPU 110. An RF switch 170 may be coupled to the modem device 168 and an RF antenna 172. In various embodiments, there may be multiple RF antennas 172, and each such RF antenna 172 may be coupled to the modem device 168 through an RF switch 170.

As shown in FIG. 1, a keypad 174 may be coupled to the multicore CPU 110 either directly, or through the analog signal processor 126. Also, a mono headset with a microphone 176 may be coupled to the multicore CPU 110 and or analog signal processor 126. Further, a vibrator device 178 may also be coupled to the multicore CPU 110 and/or analog signal processor 126. FIG. 1 also shows that a power supply 188 may be coupled to the on-chip system 102, and in some implementations the power supply 188 is coupled via the USB controller 140. In a particular aspect, the power supply 188 is a direct current (DC) power supply that provides power to the various components of the PCD 100 that require power. Further, in a particular aspect, the power supply 188 may be a rechargeable DC battery or a DC power supply that is derived from an alternating current (AC) to DC transformer that is connected to an AC power source.

The multicore CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103. However, other types of thermal sensors 157 may be employed without departing from the scope of the invention.

FIG. 1 further indicates that the PCD 110 may also include a network card 114 that may be used to access a data network, e.g., a local area network, a personal area network, or any other network. The network card 114 may be a Bluetooth network card, a WiFi network card, a personal area network (PAN) card, or any other network card well known in the art. Further, the network card 114 may be incorporated in an integrated circuit. That is, the network card 114 may be a full solution in a chip, and may not be a separate network card 114.

As depicted in FIG. 1, the display/touchscreen 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, and the power supply 180 are external to the on-chip system 102.

The on-ship system 102 may also include various bus controllers (not shown). For example, a first example of a may be responsive to signals in the bus interface that communicatively couples the CPU 110 to components of a multimedia subsystem, including the video encoder 134. It should be understood that any number of similarly configured bus controllers can be arranged to monitor a bus interface arranged in the on-chip system 102. Alternatively, a single bus controller could be configured with inputs arranged to monitor two or more bus interfaces that communicate signals between CPU 110 and various subsystems of the PCD 100 as may be desired.

In a particular aspect, one or more of the method steps described herein may be enabled via a combination of data and processor instructions stored in the memory 112. These instructions may be executed by one or more cores or processors in the multicore CPU 110 in order to perform the methods described herein. Further, the multicore CPU 100, one or more of the cores 222, 224, 230, the memory 112, or a combination thereof may serve as a means for executing one or more of the method steps described herein in order enable dynamic QoS levels based on co-processor operation.

FIG. 2A is a graph illustrating an exemplary theoretical operation of a co-processor over a period of time that is supported by an application processor (such as an application core) that may be implemented in the PCD embodiment illustrated in FIG. 1. In FIG. 2A, the horizontal axis represents time, and is broken into four time periods T1-T4 by way of example. The wave portion of the graph shows a theoretical load for a co-processor, using for example a graphics processing unit (GPU) such as the first core 224 illustrated in FIG. 1 as the co-processor. The load illustrated may be in terms of the operating frequency of the co-processor/GPU or any other operational attribute of the coprocessor/GPU.

The vertical axis in FIG. 2A represents the rail current of the application core or processor, such as the zeroth core 222 illustrated in FIG. 1. In typical systems, once the GPU begins operation and has need of the application processor, the GPU sends and/or the application processor sets a quality of service QoS restriction on the application processor. Such QoS restriction may be a baseline level of operation for the application processor below which the application processor may not go, illustrated in FIG. 2A as the low power mode (LPM) baseline value.

Thus, regardless of the actual needs of the co-processor at any given time, the application processor is not allowed to power down below the exemplary LPM baseline illustrated in FIG. 2. However, as illustrated in the graph of FIG. 2A, the actual operation of the co-processor may vary greatly over time. Continuing with the example of a co-processor as a GPU, in the first two time periods, T1 and T2, the GPU may be operating at a high frame rate, such as 30 frames per second (FPS) such that the GPU may be considered "busy" or operating at more than 80% capacity. Under such circumstances, the GPU needs the application processor to operate above the LPM baseline in order to enable the GPU to maintain its own high level of operation.

As illustrated in FIG. 2A, the GPU may then slow down, as illustrated in time periods T3 and T4 where the GPU is operating at a lower frame rate, such as 15 FPS, and at less than 80% capacity. Under these circumstances, the GPU may not need the application processor to operate at the LPM baseline in order to the GPU to maintain its own lower level of operation, and the GPU would be able to operate if the application processor entered into a lower power mode, including a zero rail current mode. Moreover, as illustrated in FIG. 2A, the time periods T1-T4 may not be equal. In an example where the GPU is providing graphics for a game, the time periods T1 and T2 where the GPU is operating at the higher 30 FPS level may be shorter (illustrated as 33 mSec) than the time periods T3 and T4 where the GPU is operating at the lower 15 FPS level (illustrated as 66 mSec).

FIG. 2B is a graph illustrating an exemplary power mode of the application processor during the theoretical load illustrated in FIG. 2A. In FIG. 2B, the vertical axis represents the operating power level at which the application processor may be held based on the initial determination that the co-processor/GPU requires a certain QoS level. The "power level" may be measured by/relative to the operating frequency of the application processor, the rail current of the application processor, or any other operational attribute of the application processor that varies with the load on the application processor.

As illustrated in FIG. 2B, in typical systems, regardless of the actual operation level of the co-processor/GPU, the application processor is held to a constant high power level or mode, illustrated as a Full power mode in FIG. 2B. Even if the actual needs of the co-processor/GPU, such as at time periods T3 and T4 in FIG. 2A, do not need the application processor to operate at the Full mode, the application processor is prevented from entering into a lower power mode (illustrated as Shallow LPM and Deep LPM in FIG. 2B) or otherwise optimizing power, by the initial QoS restriction placed on the application processor by the co-processor/GPU. This unnecessary holding of the application processor to the higher power mode can result in a significant increase in the power consumption of the application processor.

Figure 3:
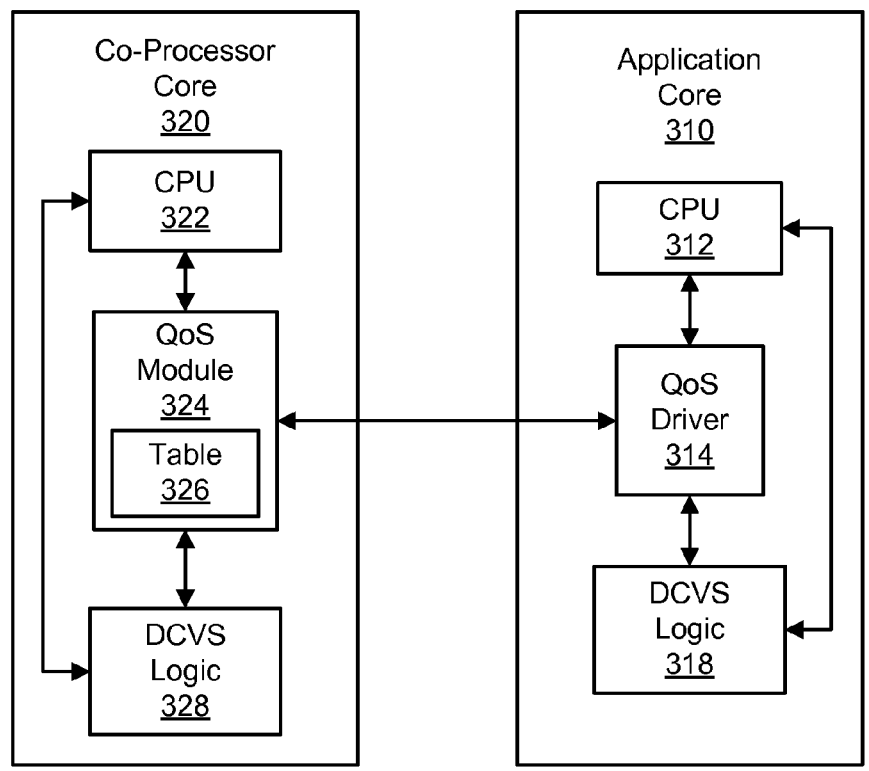
FIG. 3 is a block diagram showing an exemplary system for supporting dynamic quality of service levels based on co-processor operation in a PCD.

FIG. 3 is a block diagram showing an exemplary system for supporting dynamic quality of service levels based on co-processor operation in order to better manage power consumption by processing components. In the embodiment of the system 300 of FIG. 3, a co-processor, shown in FIG. 3 as a Co-Processor Core 320. The Co-Processor Core 320 could be could be any type of processor, DSP, or core 222, 224, 230 in a PCD 100, including a GPU/graphics core, a modem processor/core, a WiFi processor/core, a video decoder processor/core, an audio decoder processor/core, etc. that depends at least in part on the Application Core 310 to operate. In other embodiments, the co-processor could be any device, such as a peripheral those operation or through-put requires a quality of service level from, or places a quality of service demand upon, the application core.

In the implementation illustrated in FIG. 3, the Co-Processor Core 320 includes a processor, CPU 322, a QoS Module 324 in communication with the CPU 322, and DCVS Logic 328 in communication with the CPU 322. In the implementation of FIG. 3, the DCVS Logic 328 is a separate component operating a dynamic clock and voltage scaling (DCVS) algorithm for the Co-Processor Core 320 and/or CPU 322 of the Co-Processor Core 320. In other implementations, the DCVS Logic 328 and the QoS Module 324 may be combined into one module, the DCVS Logic 328 may be part of the CPU 322, or the DCVS Logic 328 may be omitted altogether.

As illustrated in FIG. 3, the Co-Processor Core 320 also includes a QoS Module 324 in communication with both the CPU 322 and the DCVS Logic 328. The QoS Module 324 may be implemented in hardware, software, or firmware as desired. The illustrated QoS Module 324 of FIG. 3 includes a Table 326 which, as discussed below, may contain QoS values corresponding to operating frequencies for the Co-Processor Core 320. Regardless of how implemented the QoS Module 324 allows the Co-Processor Core 320 to determine a QoS level the Co-Processor Core 320 needs from the Application Core 310 as discussed below, in order to allow the Co-Processor Core 310 to operate under its present load/frequency.

The configuration of the features of the Co-Processor Core 320 in FIG. 3, including the QoS Module 324 is illustrative and non-limiting. For example, although shown as being contained in the QoS Module 324, the Table 326 may be located apart from the QoS Module 324, such as in a memory of the Co-Processor Core 320 in communication with the QoS Module 324. Similarly, the QoS Module 324 and/or DCVS Logic 328 may include, or may be in communication with a timer or counter (not shown) to allow the QoS Module 324 and/or DCVS Logic 328 to operate at desired time intervals. Additionally, although the CPU 322 itself is illustrated as being contained within the Co-Processor Core 320, in some implementations the CPU 322 could be external to, but in communication with, the Co-Processor Core 320. In some implementations the CPU 322 itself may comprise the Co-Processor Core 320.

The exemplary system of FIG. 3 also includes an application processor in communication with the Co-Processor Core 320, illustrated as an Application Core 310 in communication with the Co-Processor Core 320. The Application Core 310 could be one of the cores 222, 224, 230 of the multicore CPU 110 illustrated in FIG. 1, or any type of processor, DSP, or core operating applications for the PCD 100. In the implementation illustrated in FIG. 3, the Application Core 310 includes a processor, CPU 312. Although the CPU 312 is illustrated as being contained within the Application Core 310, in some implementations the CPU 312 could be external to, but in communication with, the Application Core 310. Additionally, the in some implementations the CPU 312 itself may comprise the Application Core 310.

As illustrated in FIG. 3, the CPU 312 is in communication with a QoS Driver 314 and DCVS Logic 318. The DCVS Logic 318 is optional, and when present performs dynamic clock and voltage scaling for the Application Core 310 and/or processor CPU 312 of the Application Core 310. The Application Core 310 includes a QoS Driver 314, illustrated in FIG. 4 as a separate component in communication with the CPU 312 and the DCVS Logic 318. The QoS Driver 314 may be implemented in hardware, software, or firmware as desired. Additionally, although illustrated as an external to the CPU 312, the QoS Driver 314 may instead be part of the CPU 312. Similarly, the QoS Driver 314 may in some implementations be combined with the DCVS Logic 318 to form one module.

Regardless of how implemented, the QoS Driver 314, acting by itself or in combination with other components of the Application Core 310 receives the communication from the Co-Processor Core 320 about the QoS level needed by the Co-Processor Core 320. Based at least in part based on the received communication, the Application Core 310 may determine whether it may optimize power consumption, such as by entering into a reduced or lowered power state or mode (such as for example reducing the rail current or operating frequency of the Application Core 310) or by shifting to one or more low/lower bandwidth cores dynamically if the Application Core 310 is operating in a heterogeneous environment.

In operation, the system 300 of FIG. 3 allows for an application processor, such as Application Core 310 to provide dynamic quality of service (QoS) levels to a co-processor, such as Co-Processor Core 320, whose operation depends at least in part on the Application Core 310. When the Co-Processor Core 320 begins operating to perform a task, such as a GPU rendering graphics in one example, the GPU/Co-Processor Core 320 may as part of its initial operation set a QoS restriction on the Application Core 310, which is typically a some value, such as a minimum frequency or rail current to which the Application Core 310 operate. This initial QoS restriction may be communicated to and/or set at or by the Application Core 310 by any desired method.

During operation, the Co-Processor Core 320 will periodically determine whether its own operation justifies or requires the QoS restriction on the Application Core 320. If the operation of the Co-Processor Core 320 does not justify or require the QoS restriction, the Co-Processor Core 320 will determine a new QoS level needed from the Application Core 320 and communicate the new QoS restriction or level to the Application Core 320.

In one embodiment, the determination by the Co-Processor Core 320 may be a periodic determination of the operational load on the Co-Processor Core 320 and/or CPU 322 of the Co-Processor Core 320 by the QoS Module 324 in communication with the CPU 322. This determination of the of load may depend on or take into account a variety of factors, including the load on the Co-Processor Core 320, latency requirements of the applications or tasks the Co-Processor Core 320 is operating, thermal conditions of the Co-Processor Core 320, etc.

This determination of the load may be made independently by the QoS Module 324 acting at time intervals tracked by a timer or counter (not shown in FIG. 3) contained within or in communication with the QoS Module 324. Upon determining the load on the Co-Processor Core 320 and/or CPU 322 of the Co-Processor Core 320, the QoS Module 324 may then determine the appropriate frequency at which the Co-Processor Core 320 and/or CPU 322 of the Co-Processor Core 320 should operate based on the load (and/or based on additional considerations such latency requirements of the applications or tasks the Co-Processor Core 320 is operating, thermal conditions, etc.) and apply that frequency to the Co-Processor Core 320 and/or CPU 322 of the Co-Processor Core 320.

Based on the determined frequency, the QoS Module 324 may then determine or select a QoS level needed from the Application Core 310 in communication with the Co-Processor Core 320. In some implementations, this determination by the QoS module 324 may be a determination of a QoS value that translates into or equates to a minimum frequency or rail current for the Application Core 320. In other embodiments, this determination by the QoS module may be a determination of a QoS value that translates into or equates to a low power mode state into which the Application Core 310 may be allowed to enter. The determination by the QoS module 324 may be made by any desired means, such as by application of one or more algorithms, or a look-up table, such as Table 326 illustrated in FIG. 3.

For example, in one implementation, the determination by the QoS Module 324 may comprise looking up a QoS value in the Table 326 corresponding to the determined appropriate frequency for the Co-Processor Core 320, such as exemplary table below:

TABLE 1

| Co-Processor Frequency | Quality of Service (QOS) Value | Effect On Application Processor |
|---|---|---|
| 100 MHz | 1 | No QoS Restriction At All |
| 200 MHz | 2 | Allow Deep LPM State |
| 300 MHz | 3 | Allow Medium LPM State |
| 400 MHz | 4 | Allow Shallow LPM State |
| 500 MHz | 5 | No LPM State Allowed |

Regardless of how determined, a QoS value is communicated to the Application Core 310 and the QoS Module 324 may reset the counter or timer to the next time interval where the load on the Co-Processor Core 320 or CPU 322 of the Co-Processor Core 320 will be determined. In the embodiment illustrated in FIG. 3, the QoS Module 324 communicates the QoS value to a component of the Application Core 310. In other embodiments, the CPU 322 of the Co-Processor Core 320 may communicate the QoS value to the Application Core 310, such as to the CPU 312 or other component of the Application Core 310. In other embodiments, the QoS Module 324 or CPU 322 may place the QoS value into a memory (not shown) that is in communication with both the Co-Processor Core 320 and the Application Core 310, and one or more component of the Application Core 310 may read or retrieve the QoS value from the memory.

In various embodiments, one or more of the above functions or operations listed as performed by the QoS Module 324 may be performed by other components of the Co-Processor Core 320, or by the QoS Module 324 in combination with other such components. For example, in an embodiment, determination of the QoS level needed from the Application Core 310 may be implemented as part of a pre-existing DCVS algorithm for the Co-Processor Core 320, such as DCVS Logic 328 illustrated in FIG. 3.

In such embodiments, the DCVS Logic 328 may compute the load on the Co-Processor Core 320 and/or CPU 322 of the Co-Processor Core 320. The DCVS Logic 328 may then find the right frequency for the Co-Processor Core 320 and/or CPU 322 and apply that frequency to the Co-Processor Core 320 and/or CPU 322. In such embodiments, the QoS Module 324, either as a separate module as illustrated in FIG. 3 or as a portion of the DCVS Logic 328, may then determine the QoS level needed from the Application Core 310 and communicate the needed QoS level and/or QoS value to the Application Core 310 as discussed above. The DCVS Logic 328, or a timer or counter (not shown) that is part of or in communication with the DCVS Logic 328 may then determine the next time or time interval at which the Co-Processor Core 320 and/or CPU 322 load will next be determined or sampled, and restart the process or functions at that time.

The QoS level needed by the Co-Processor Core 320 and/or QoS value is received by Application Core 310 or retrieved by the Application Core 310 from a memory as discussed above. The Application Core 310 will then determine appropriate power optimization measures to take, such as for example what low power mode (LPM), if any, the Application Core 310 can enter based at least in part on the received or retrieved QoS level and/or QoS value. Other appropriate power optimization measures may include in some embodiments, shifting to low or lower bandwidth cores dynamically when there are multiple Application Cores 310 (not shown) and/or when the Application Core 310 is operating in a heterogeneous environment. This determination by the Application Core 310 may also be made on or take into consideration additional factors, such as an operational load of the Application Core 310, the architecture of the Application Core 310, and/or the frequency of the Application Core 310.

In the embodiment illustrated in FIG. 3, the Application Core 310 may include a QoS Driver 314 that receives the communication from the Co-Processor Core 320. In other embodiments, the communication may be received or retrieved from a memory by the CPU 312 of the Application Core 310, or another component of the Application Core 310, and communicated to the QoS Driver 314.

As discussed above, the communication received may include a QoS value that translates into an operating frequency or rail current for the Application Core 310 required to enable the Co-Processor Core 320 and/or CPU 322 to handle or maintain the Co-Processor Core 320 operational load. In such embodiments, QoS Driver 314 may translate or interpret the received communication and determine whether the Application Core 310 and/or the CPU 312 of the Application Core 310 may enter a lower power mode, despite the initial QoS restriction originally placed on the Application Core 310. This determination may also be based on additional information, such as the present operational load of the Application Core 310 and/or any other QoS restrictions from any additional co-processors in communication with the Application Core 310 (not shown).

In some embodiments, the determination by the QoS Driver 314 may be made immediately upon receipt of QoS value, whether directly from the Co-Processor Core 320 or from another component or portion of the Application Core 310. For example, in such embodiment when the QoS Driver 314 receives the QoS value it may determine the present operational load of the Application Core 310. This determination may also include a determination of the frequency and/or power requirements for the Application Core 310 and/or CPU 312 of the Application Core 310 to maintain or operate the present workload of the Application Core 310 and/or CPU 312. The QoS Driver 314 may then determine based on the received QoS value from the Co-Processor Core 320 and the operational load of the Application Core 310 which lower power mode the Application Core 310 may enter, if any.

As would be recognized by one skilled in the art, in such embodiments the QoS Driver 314 may act alone for the various determinations for the Application Core 310, including in implementations where the Application Core 310 does not have the DCVS Logic 318 illustrated in FIG. 3 at all. In other implementations, the various discussed determinations may be made by the QoS Driver 314 in combination with other components or modules, such as the DCVS Logic 318 of the Application Core 310 illustrated in FIG. 3. Regardless of how made, receipt of the communication from the Co-Processor Core 320 in these embodiments causes an immediate determination of whether or not the power optimization measures may be taken, such as for example whether Application Core 310 and/or CPU 312 can enter into a lower power mode, or even enter into a zero current mode.

In other embodiments, the determinations by the QoS Driver 314 may not be made immediately upon receipt of QoS value. In such embodiments, when the QoS Driver 314 receives the QoS value the QoS Driver 314 may instead store the QoS value and/or information about QoS level required to enable the Co-Processor Core 320 and/or CPU 322 to handle or maintain the Co-Processor Core 320 operational load. In such embodiments the QoS Driver 314 may then use the stored information, or provide the stored information, as part of a later determination of whether Application Core 310 should take power optimization measures such as entering into a lower power mode. One example of a later determination may be a regularly scheduled operation of the DCVS Logic 318 illustrated in FIG. 3. In these embodiments, when the DCVS Logic 318 of the Application Core 310 operates the DCVS algorithm, the DCVS Logic 318 may query the QoS Driver 314 to obtain the QoS value or QoS level requirements for the Co-Processor Core 320 (or the DCVS Logic 318 may be part of the QoS Driver 314). In this manner, these embodiments allow the QoS value and/or QoS levels required by the Co-Processor Core 320 and/or CPU 322 to be later considered as part of the regular operation of the DCVS Logic 318 of the Application Core 310.

Regardless of when made, if the determination is that the QoS value/QoS level requirements of the Co-Processor Core 320 (and/or the Application Core 310 operation load) allow for power optimization measures, the power optimization measures may be implemented. In some embodiments, the power optimization measurements may include entering the Application Core 310 to enter into a lower power mode or state. This may be effected by the QoS Driver 314 itself causing the Application Core 310 to enter into the lower power mode/state, or by the QoS Driver 314 signaling another component, such as the DCVS Logic 318 for example, to effect such change into a lower power mode or state. Such low or lower power states or modes that may be determined for/entered into by the Application Core 310 may include states or modes where: the frequency of the Application Core 310 or CPU 312 of the Application Core 310 is reduced; the rail current of the Application Core 310 or CPU 312 is reduced (including reduced to zero); one CPU 312 or core in a multi-CPU or multi-core Application Core 310 is entered into a lower power mode or state while a second CPU/core of the multi-core Application Core 310 (not shown) is maintained at a higher power mode or state; or any other desired means for reducing the power consumption of the Application Core 310.

Figure 4:
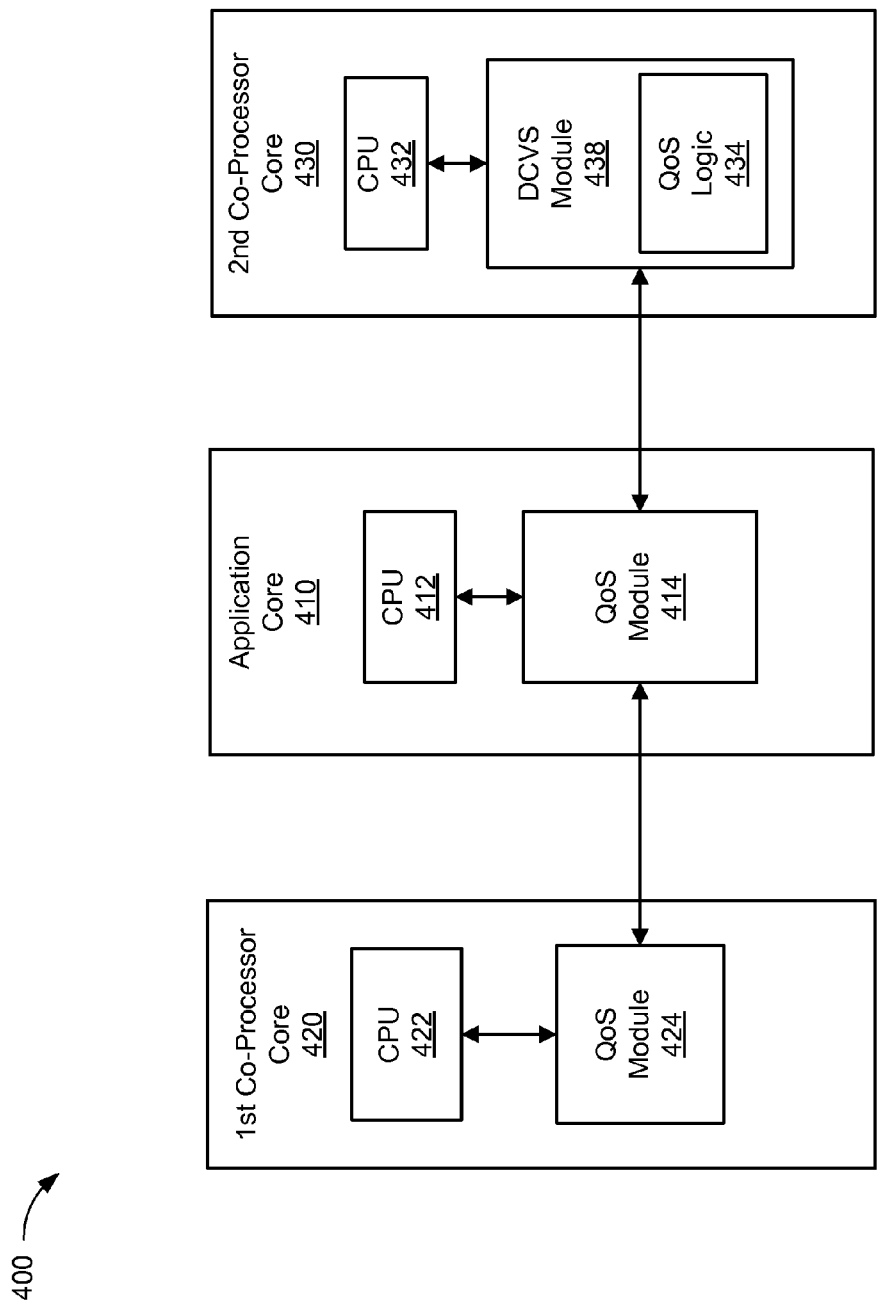
FIG. 4 is a block diagram showing another exemplary system for supporting dynamic quality of service levels based on co-processor operation in a PCD.

FIG. 4 is a block diagram showing another exemplary system for supporting dynamic quality of service levels based on co-processor operation in order to manage power consumption by processing components. The system 400 illustrated in FIG. 4 includes an application processor, illustrated as Application Core 410. The embodiment of the system 400 illustrated in FIG. 4 is similar to the system 300 of FIG. 3, except that the system 400 of FIG. 4 includes two co-processors in communication with the Application Core 410, illustrated as the First Co-Processor Core 420 and the Second Co-Processor Core 430. Although two co-processors are illustrated for ease of understanding, the system 400 may include any number of co-processors in communication with Application Core 410.

The Application Core 410 illustrated in FIG. 4 could be one of the cores 222, 224, 230 of the multicore CPU 110 illustrated in FIG. 1, or any type of processor, DSP, or core operating applications for the PCD 100. In the implementation illustrated in FIG. 4, the Application Core 410 includes a processor, CPU 412. Although the CPU 412 is illustrated as being contained within the Application Core 410, in some implementations the CPU 412 could be external to, but in communication with, the Application Core 410. Additionally, the in some implementations the CPU 412 itself may comprise the Application Core 410. The implementation of the Application Core 410 illustrated in FIG. 4 includes a QoS Module 414 that performs the functions and operations for the Application Core 410 discussed above with respect to the Application Core 310 of FIG. 3. The Application Core 410 illustrated in FIG. 4 does not have separate DCVS Logic 318 like the Application Core 310 of FIG. 3. In some embodiments of the QoS Module 414 of FIG. 4, such DCVS functionality is contained within the QoS module 414, while in other embodiments, such DCVS functionality is not implemented at all for the Application Core 410.

The First Co-Processor Core 420 and Second Co-Processor Core 430 can be any type of processor, DSP, or core 222, 224, 230 in a PCD 100, including a GPU/graphics core, a modem processor/core, a WiFi processor/core, a video decoder processor/core, an audio decoder processor/core, etc. that each depend at least in part on the Application Core 410 to operate. FIG. 4 illustrates alternative implementations for the co-processor than that illustrated in FIG. 3.

For example, the First Co-Processor Core 420 of FIG. 4 includes a CPU 422 in communication with a QoS Module 424 and no separate DCVS logic like the DCVS Logic 328 of the Co-Processor Core 320 illustrated in FIG. 3. In some embodiments, the QoS Module 424 of the First Co-Processor Core 420 will include the DCVS logic or algorithm for the First Co-Processor 420, while in some embodiments no DCVS logic algorithm will be implemented in the First Co-Processor 420 of FIG. 4. The Second Co-Processor Core 430 by contrast is illustrated in FIG. 4 to include a CPU 432 in communication with a DCVS Module 438. The DCVS Module 438 of the Second Co-Processor Core 430 includes the QoS Logic 434. The configurations of the features of the First Co-Processor Core 420 and Second Co-Processor Core 430 in FIG. 4 are illustrative and non-limiting.

Regardless of the configuration, the First Co-Processor Core 420 and Second Co-Processor Core 430 of FIG. 4 will each provide a QoS value or required QoS level to the Application Core 410 like that discussed above for the Co-Processor Core 320 of FIG. 3. The First Co-Processor Core 420 and Second Co-Processor Core 430 will also operate similarly to the Co-Processor Core 320 of FIG. 3. However, it is not necessary that either of the First Co-Processor Core 420 or Second Co-Processor Core 430 perform all of the operations or steps performed by the Co-Processor Core 320 of FIG. 3 (or the various functions or steps in the same order) when determining their respective QoS values and/or required QoS levels communicated to the Application Core 410. It is also not necessary that the First Co-Processor Core 420 perform all of the operations or steps performed by the Second Co-Processor Core 430 (or the various functions or steps in the same order) when determining the QoS values and/or required QoS levels communicated to the Application Core 410.

The First Co-Processor Core 420 and Second Co-Processor Core 430 of FIG. 4 may provide different QoS values and/or different required QoS levels to the Application Core 410, and may provide their values/levels to the Application Core 410 at different times and in different manners. For example, in some embodiments the First Co-Processor Core 420 may be a core or processor for the modem of a PCD 100, while the Second Co-Processor Core 430 may be a GPU similar to that discussed above with respect to FIG. 3. In such an embodiment, the Second Co-Processor Core 430 may provide QoS values to the Application Core 410 according to Table 1 discussed above for the GPU example of Co-Processor Core 320 of FIG. 3. The First Co-Processor Core 420 of this embodiment may not use a table at all, or may implement a table with very different values than the Table 1 used by Second Co-Processor Core 430. Additionally, continuing this example the modem core/First Co-Processor Core 420 may determine its operational load and QoS value/required QoS level less frequently than the Second Co-Processor Core 430, resulting in less frequent communications to the Application Core 410 from the First Co-Processor Core 420.

Thus, as one of skill in the art will appreciate, in varying embodiments the specific QoS requirements and/or the frequency those requirements may be communicated to the Application Core 410 can vary depending on the architectures of each of the First Co-Processor Core 420 and Second Co-Processor Core 430 and/or the uses of each of the First Co-Processor Core 420 and Second Co-Processor Core 430 within the PCD 100. Additionally, it would be understood that the QoS Module 324/424 can in some embodiments operate independently from any DCVS algorithm or logic that may be operating on the co-processor, or may operate in combination with such DCVS algorithm or logic as desired.

The Application Core 410 of FIG. 4 also operates similarly to the Application Core 310 discussed above in FIG. 3. In the implementation of the Application Core 410 illustrated in FIG. 4, the QoS Module 414 performs the functions and operations to determine whether or not the Application Core 410 and/or CPU 412 may take power optimization measures taking into account the needs of the co-processors, illustrated in FIG. 4 as First Co-Processor Core 420 and Second Co-Processor Core 430.

As with the implementation of FIG. 3, the QoS Module 414 illustrated in FIG. 4 may receive a communication from the First Co-Processor Core 420 with a First QoS value or QoS level required for the First Co-Processor Core 420 and/or the CPU 422 of the First Co-Processor Core 420 to operate under their present load. Additionally, the QoS Module 414 may receive a communication from the Second Co-Processor Core 430 with a Second QoS value or QoS level required for the Second Co-Processor Core 430 and/or the CPU 432 of the Second Co-Processor Core 430 to operate under their present load. Each of these communications may be received directly by the QoS Module 414, or may instead be received by another component of the Application Core 410, such as the CPU 412 which then communicates the First QoS value and/or Second QoS value to the QoS Module 414. Alternatively, if desired a component of the Application Core 410 may retrieve the First QoS value and/or Second QoS value from memory that is shared with the First Co-Processor Core 420 and/or Second Co-Processor Core 430.

Additionally, as with the implementation of FIG. 3, one of the communications received by the QoS module 414 of FIG. 4 may include a First QoS value that translates into or equates to an operating frequency or rail current for the Application Core 410 required to enable the First Co-Processor Core 420 and/or CPU 422 to handle or maintain the First Co-Processor Core 420 operational load. Similarly, a second of the communications received by the QoS module 414 of FIG. 4 may include a Second QoS value that translates into or equates to an operating frequency or rail current for the Application Core 410 required to enable the Second Co-Processor Core 430 and/or CPU 432 to handle or maintain the Second Co-Processor Core 430 operational load. In such embodiments, QoS Module 414 may translate or interpret the received communication and determine whether the Application Core 410 and/or the CPU 412 of the Application Core 410 may take power optimization measures (such as entering a lower power mode) despite the initial QoS restriction originally placed on the Application Core 410 by one or more of First Co-Processor Core 420 and Second Co-Processor Core 430. This determination may also be based on additional information, such as the present operational load of the Application Core 410, architecture of the Application Core 410, etc.

In some embodiments, the determination by the QoS Module 414 may be made immediately upon receipt of either the First QoS value or the Second QoS Value. For example, in such embodiment when the QoS Module 414 receives the First QoS value from the First Co-Processor Core 420 it may determine the present operational load of the Application Core 410. This determination may also include a determination of the frequency and/or power requirements for the Application Core 410 and/or CPU 412 of the Application Core 410 to maintain or operate the present workload of the Application Core 410 and/or CPU 412. The QoS Module 414 may then determine based on the received First QoS value from the First Co-Processor Core 420 and the operational load of the Application Core 410 what power optimization measures to implement, such as which lower power mode the Application Core 410 may enter, if any.

Similarly, in such embodiments when the QoS Module 414 receives the Second QoS value from the Second Co-Processor Core 430 it may determine the present operational load of the Application Core 410. This determination may also include a determination of the frequency and/or power requirements for the Application Core 410 and/or CPU 412 of the Application Core 410 to maintain or operate the present workload of the Application Core 410 and/or CPU 412 (including the QoS level required to meet the First QoS value). The QoS Module 414 may then determine based on the received Second QoS value from the Second Co-Processor Core 420 and the operational load of the Application Core 410 what power optimization measures to implement, such as which lower power mode the Application Core 410 may enter, if any.

In other embodiments, the determinations by the QoS Module 414 may not be made immediately upon receipt of either of the First QoS value or the Second QoS value. In such embodiments, when the QoS module 414 receives the First QoS value or the Second QoS value, the QoS Module 414 may instead store the First and Second QoS values and/or information about First and Second QoS level required to enable the First Co-Processor Core 420 and Second C-Processor Core 430, respectively, handle or maintain their operational loads. In such embodiments the QoS Module 414 may then use the stored information, or provide the stored information, as part of a later determination of whether Application Core 410 may take power optimization measures.

One example of a later determination of power optimization measures may be a regularly scheduled operation of DCVS logic or a DCVS algorithm for the Application Core 410 (which may if desired be part of the QoS module 414). In these embodiments, when the DCVS logic or algorithm of the Application Core 410 operates it may take into account the First QoS value and/or Second QoS value and/or other information stored in the QoS Module 414 about the QoS level needs of the First Co-Processor Core 420 or Second Co-Processor Core 430. In this manner, these embodiments allow the QoS value and/or QoS levels required by the First Co-Processor Core 420 and/or Second Co-Processor Core 430 to be later considered as part of the regular operation of a DCVS algorithm of the Application Core 410.

It is not required in the above-discussed embodiments that the QoS Module 414 gives equal consideration or weight to the communications from the First Co-Processor Core 420 and Second Co-Processor Core 430. In this manner, Application Core 410 may also dynamically control the bandwidth of inter-connected buses (partially shown with the arrows in FIG. 4) through the implementations of differing QoS levels for the First and Second Co-Processor Core 420/430. For example, in some implementations, the QoS Module 414 may determine, based on an algorithm look-up table, set of rules, etc., that communications of the Second QoS value from the Second Co-Processor Core 430 may be considered immediately, while communications of a First QoS value from the First Co-Processor Core 420 may be stored by the QoS Module 414 for later consideration, such as during part of a regularly scheduled application of a DCVS algorithm for the Application Core 410. Additionally, in some embodiments, each of First Co-Processor Core 420 and Second Co-Processor Core 430 may "vote" for a respective QoS level needed from Application Core 410 with the determination of the appropriate QoS level for one or more of the Co-Processor Cores 420/430 determined by the Application Core 410 in accordance with the "votes" received.

Similarly, in some implementations, when making a determination whether or not the Application Core 410 may enter a lower power mode or state based on the First QoS value, the Second QoS value, and the operational load of the Application Core 410, the QoS Module 414 may not give equal weight to the First QoS value and Second QoS value. For example, the QoS module 414 may, based on an algorithm, look-up table, rules set, etc. may give a higher priority or give greater weight to the First QoS value or the Second QoS value if desired. In such implementations, the Application Core 410 may thus give greater weight to the QoS needs of one of the co-processors over the other co-processors if the applicable algorithm, table, rules set, etc., determines such unequal consideration is advantageous for power savings or other reasons. One example other reason may be to dynamically control the bandwidth of inter-connected buses (partially shown with the arrows in FIG. 4) through the implementations of differing QoS levels for the First and Second Co-Processor Core 420/430.

Regardless of how determined, the Application Core 410 may determine to implement power optimization measures. In some embodiments the measures may include entering the Application Core 410 into a low power mode or state. Exemplary low power states or modes for the Application Core 410 for such embodiments may include states or modes where: the frequency of the Application Core 410 or CPU 412 of the Application Core 410 is reduced; the rail current of an the Application Core 410 or CPU 412 is reduced (including reduced to zero); dynamically switching to a low or lower bandwidth CPU 412 or core in a multi-CPU, multi-core, and/or heterogeneous environment; entering one CPU 412 or core in a multi-CPU or multi-core Application Core 410 into a lower power mode or state while a second CPU/core of the multi-core the Application Core 410 (not shown) is maintained at a higher power mode or state; or any other desired means for reducing the power consumption of the Application Core 410.

Figure 5A:
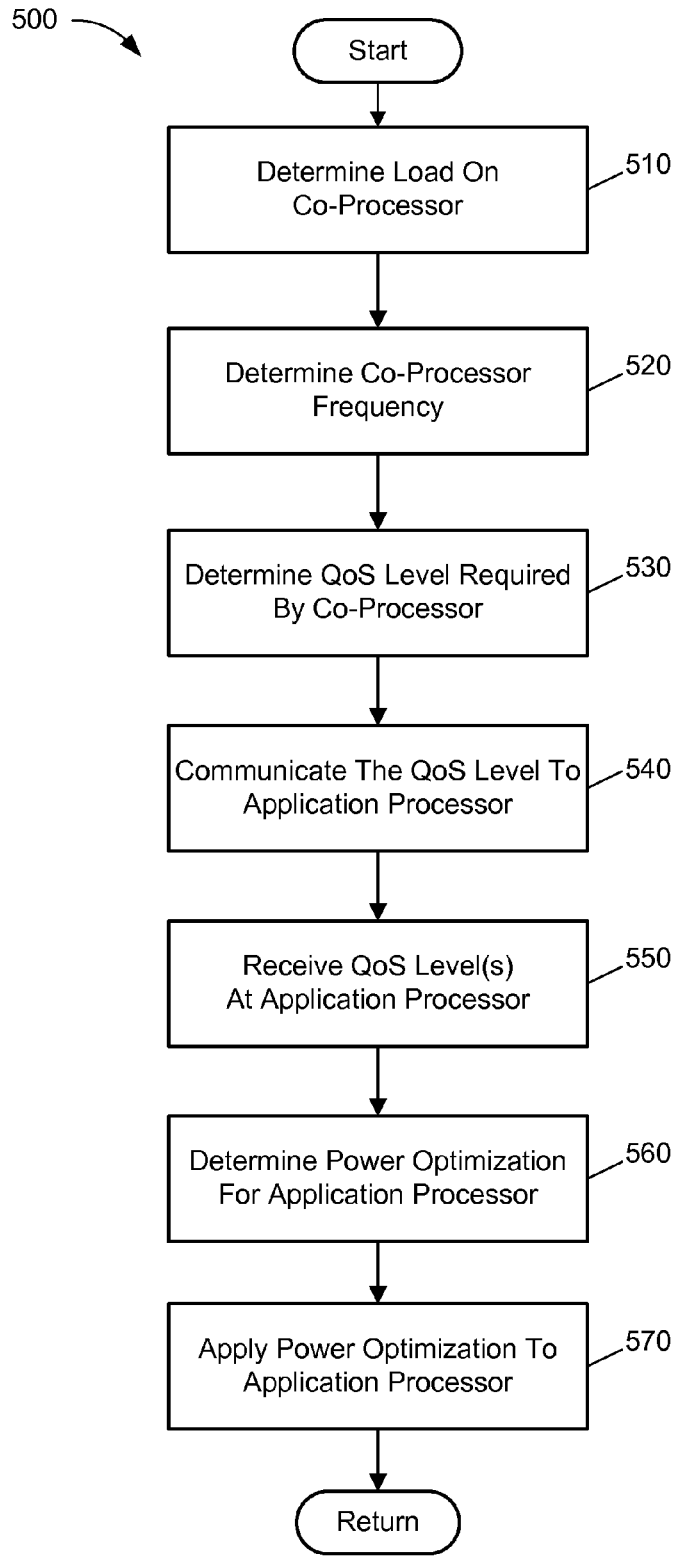
FIG. 5A is a flowchart describing an exemplary embodiment of a method for providing dynamic quality of service levels based on co-processor operation in a PCD.
Figure 5B:
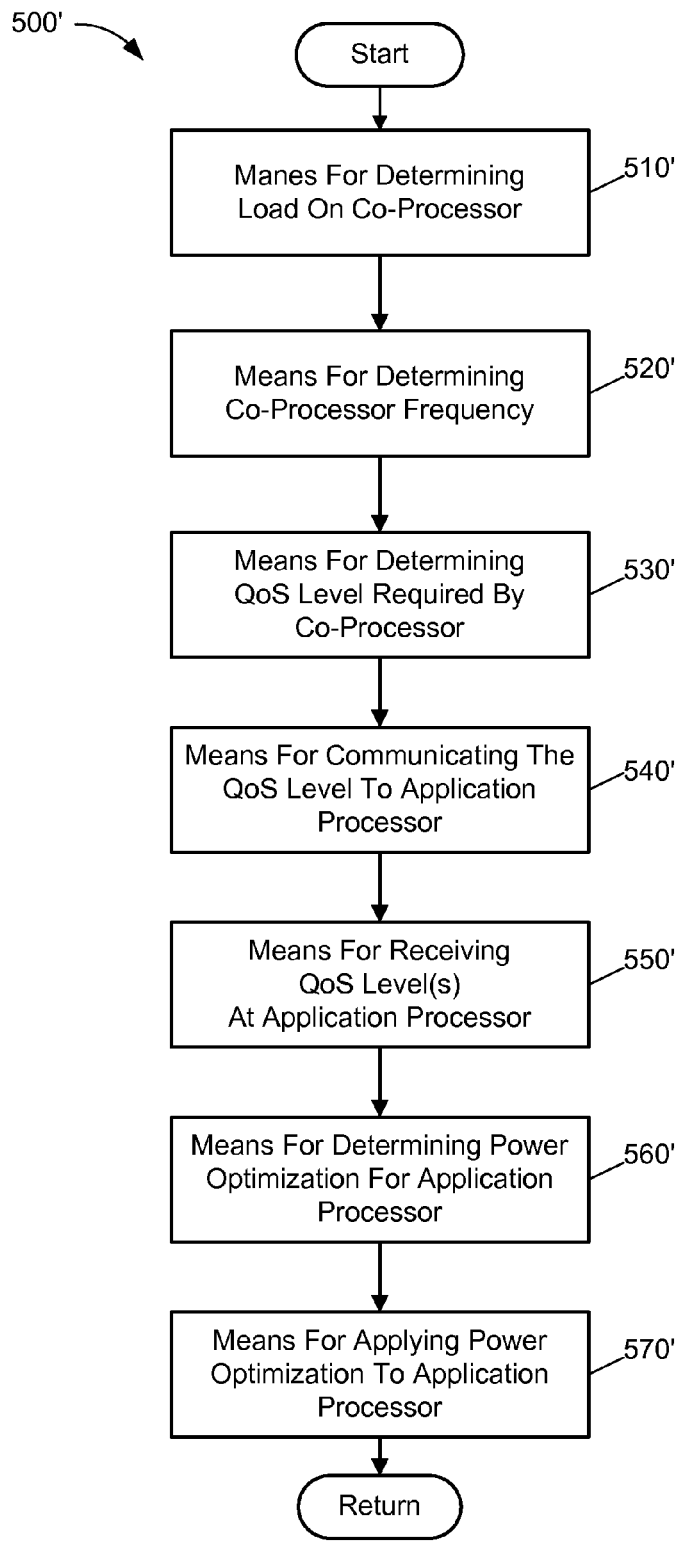
FIG. 5B illustrates example components capable of performing the method illustrated in FIG. 5A and/or providing a means for performing the method illustrated in FIG. 5A.

FIG. 5A is a flowchart describing an exemplary embodiment of a method for providing dynamic quality of service levels based on co-processor operation, such as in processor components used in or with a PCD 100. The method 500 begins with block 510 where the load on at least one co-processor is determined. As discussed above with respect to FIG. 3 and FIG. 4, the co-processor is in communication with an application processor and the co-processor depends at least in part on the application processor for the proper operation of the co-processor. The load determined at block 510 may be the present operational load on a Co-Processor Core 320 (FIG. 3) or a First or Second Co-Processor Core 420/430 in embodiments where more than one co-processor is present, such as the embodiment illustrated in FIG. 4. As discussed above, this load may be determined by a QoS Module 324/424 of a co-processor operating independently of any DCVS Logic 318 or algorithm that may be operating for the co-processor. Alternatively, in other embodiments, the determination may be made by QoS Logic 434 that is part of or contained within a DCVS Module 438 of a co-processor.

At block 520 an appropriate frequency for the co-processor is determined based on the load determined at block 510. This frequency may also be determined by a QoS Module 324/424 of a co-processor operating independently of any DCVS Logic 318 or algorithm that may be operating for the co-processor. Alternatively, in other embodiments, the determination may be made by QoS Logic 434 that is part of or contained within a DCVS Module 438 of a co-processor.

At block 530 a present QoS level required by the co-processor is determined. This present QoS level is a quality of service level needed by the co-processor from an application processor such as Application Core 310/410 on which the co-processor depends at least in part to operate. The QoS level may be determined at least in part based on the previously determined load at block 510 and/or determined frequency at block 520. Determination of the QoS level required by the co-processor at block 530 may also take into account any desired factors, including the load on the co-processor, latency requirements of the applications or tasks the co-processor is operating, thermal conditions of the co-processor, etc.

In some embodiments this determination of the QoS level required by the co-processor at block 530 may be a determination of a QoS value that translates into or equates to a minimum QoS required from the application processor, such as a minimum frequency or rail current for the application processor. In other embodiments this determination of the QoS level required by the co-processor may be a determination of a QoS value that translates into or equates to a low power mode or state into which the application processor may be allowed to enter.

The determination of the QoS level required by the co-processor at block 530 may be made by any desired means, such as by application of one or more algorithms, or by a look-up table such as Table 1 discussed above. In embodiments with more than one co-processor, such as the First Co-Processor Core 420 and Second Co-Processor Core 430 of FIG. 4, the determination at block 530 may be made independently for each co-processor, using a different method or manner of determination for each co-processor as desired.

At block 540, the QoS level required by the co-processor is communicated to the application processor. In embodiments with more than one co-processor, such as the embodiment of FIG. 4 above, the communications may be independently made, in different manners, and at different times, by each of the co-processors. The QoS level may be communicated by communicating a QoS value or other information that translates into that translates into or equates to a minimum QoS level required by the co-processor from the application processor. Additionally, communicating the QoS level to the application processor may include in some implementations storing the QoS value or other information into a memory in communication with the co-processor and the application processor.

At block 550 the QoS level(s) are received at the application processor such as Application Core 310/410. The QoS level received by the application processor may be a QoS value or other information that translates into that translates into or equates to a minimum QoS level required by the co-processor that is received by the application processor. Additionally, the QoS level received may be a value or other information that translates into or equates to a lower power state or mode that the application processor may enter into. In embodiments with more than one co-processor, such as the embodiment of FIG. 4 above, the QoS level requirements from each co-processor may be independently received, received in different manners, and received at different times, by the application processor, such as Application Core 410 of FIG. 4. Moreover, in some embodiments receiving the QoS level at the application processor may include receiving or retrieving a QoS value or other information from a memory in communication with the co-processor and application processor.

At block 560 a determination is made whether the application processor can take one or more power optimization measures, such as entering into a low power mode or state. The determination in block 560 is based at least in part on the information received from, or obtained/read from, the co-processor, about the QoS level required by the co-processor such as the QoS value. In some embodiments, the determination in block 560 may be made based on additional factors, including the operational load of the application processor, the architecture of the application processor, and/or the frequency of the application processor.

In some embodiments, the determination at block 560 may be made by a QoS Driver 314, either acting alone or in combination with other components of an application processor/such as DCVS Logic 318 of the Application Core 310 illustrated in FIG. 3. In other embodiments, the determination at block 560 may be made by a separate QoS Module 414 of an application processor that is not operating any DCVS logic or algorithm, such as Application Core 410 illustrated in FIG. 4.

Additionally, in some embodiments, the determination in block 560 may be made immediately upon the information about a QoS level being received by the application processor. In other embodiments, the determination in block 560 may not be immediately made, but may instead be made at a later time, such as at a later regularly scheduled operation of a DCVS algorithm or logic for the application processor, such as Application Core 310/410. In yet other embodiments where more than one co-processor is sending QoS level information to the application processor, such as the embodiment illustrated in FIG. 4, the determination at block 560 may be made immediately for the QoS level communicated from one co-processor (such as First Co-Processor Core 320), while the determination is made later for the QoS level communicated from a different co-processor (such as Second Co-Processor Core 330).

In various embodiments, the determination at block 560 may include for example, selecting one or more, among several power optimization measures that the application processor may take. This determination may be accomplished by any desired means, such as by references to a look-up table. In other embodiments, the determination at block 560 may include determining, such as with an algorithm, a specific lower power mode or state for the application processor. Such power optimization measures may include: reducing the frequency of an application processor or CPU of an application processor; reducing the rail current of an application processor or CPU of an application processor reduced (including reduced to zero); dynamically switching to a low or lower bandwidth CPU or core in a multi-CPU, multi-core, and/or heterogeneous environment; entering one or more CPUs or cores in a multi-CPU, multi-core, and/or heterogeneous environment into a lower power mode or state while a second CPU/core is maintained at a higher power mode or state; or any other desired means for reducing the power consumption of the application processor.

At block 570, the power optimization measure determined at block 560 may be applied to the application processor, such as by the QoS Driver 314/QoS Module 414 applying measure (such as a low power mode or state), or by causing other components of the application processor to apply the power optimization measure.

FIG. 5A describes only one exemplary embodiment of a method for providing dynamic quality of service levels based on co-processor operation, such as in processor components used in or with a PCD 100. In other embodiments, additional blocks or steps may be added to the method 500. Similarly, in some embodiments various blocks or steps shown in FIG. 6A may be combined or omitted, such as for example omitting block 520 entirely or combining blocks 510 and 520 into one determining block/step rather than the two separate blocks/steps illustrated in FIG. 5A. Such variations of the method 500 are within the scope of this disclosure.

Additionally, certain steps in the processes or process flows described in this specification naturally precede others for the invention to function as described. However, the invention is not limited to the order of the steps described if such order or sequence does not alter the functionality of the invention, such as for example performing block 530 before block 520. Moreover, it is recognized that some steps may performed before, after, or in parallel (substantially simultaneously) with other steps without departing from the scope of the disclosure. In some instances, certain steps may be omitted or not performed without departing from the disclosure. Further, words such as "thereafter", "then", "next", "subsequently", etc. are not intended to limit the order of the steps. These words are simply used to guide the reader through the description of the exemplary method.

The various operations and/or methods described above may be performed by various hardware and/or software component(s) and/or module(s), and such component(s) and/or module(s) may provide the means to perform such operations and/or methods. For example, the determinations and communication at blocks 510-540 may be made by any hardware, software, or firmware component, and in any manner desired, including for example the manner of determining illustrated in FIG. 3 using DCVS Logic 328 and a QoS Module 324, both in communication with a CPU 322 of a Co-Processor Core 320. The determinations at blocks 510-530 may be made by an algorithm or series of algorithms, giving weight to any desired factor, consideration, or outcome; or may be made by any other desired method, such as a look-up table. Moreover, one or more of the QoS Module 324 and DCVS Logic 328 acting with the CPU 322 and other component s of the Co-Processor Core 320 (such as a memory) may comprise a means for performing the determinations at blocks 510-530. The same is true for the determination at block 560 with respect to the components of the Application Core 310 illustrated in FIG. 3. Generally, where there are methods illustrated in Figures having corresponding counterpart means-plus-function Figures, the operation blocks correspond to means-plus-function blocks with similar numbering. For example, blocks 510-570 illustrated in FIG. 5A correspond to means-plus-function blocks 510'-570' illustrated in FIG. 5B and the structure for performing the listed functions is found in the disclosure above as would be understood by one of ordinary skill in the art.

Similarly, one of ordinary skill in programming is able to write computer code or identify appropriate hardware and/or circuits to implement the disclosed methods of the disclosure without difficulty based on the flow charts and associated description in this disclosure, for example. Therefore, recitation of a particular set of program code instructions or detailed hardware devices is not considered necessary for an adequate understanding of how to make and use the described systems and methods of the disclosure. The new and novel functionality of the claimed processor-enabled processes are explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored on or transmitted as one or more instructions or code on a computer-readable medium, such as a non-transitory processor-readable medium. Computer-readable media include both data storage media and communication media including any medium that facilitates transfer of a program from one location to another.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present invention, as defined by the following claims.

What is claimed is:

1. A method for providing dynamic quality of service levels for an application processor in a multi-core on-chip system (SoC) in a portable computing device (PCD), the method comprising:
   determining an operational load of a co-processor of the SoC, wherein the co-processor is in communication with the application processor and depends on the application processor to process a workload at a power frequency sufficient to meet a minimum quality of service level required by the co-processor;
   recognizing a change in the operational load of the co-processor;
   based on the change in the operational load of the co-processor, determining an updated minimum quality of service (QoS) level required by the co-processor;
   communicating the updated minimum QoS level to the application processor;
   based on the updated minimum quality of service level required by the co-processor, determining and applying a power optimization measure to the application processor, wherein the power optimization measure operates to optimize power consumption by the application processor;
   determining a second operational load of a second co-processor of the SoC, wherein the second co-processor is in communication with the application processor and depends on the application processor to process a second workload at a power frequency sufficient to meet a minimum quality of service level required by the second co-processor;
   recognizing a change in the operational load of the second co-processor;
   based on the change in the operational load of the second co-processor, determining an undated minimum quality of service (QoS) level required by the second co-processor;
   communicating the updated minimum quality of service level required by the second co-processor to the application processor; and
   based on the updated minimum quality of service level required by the co-processor and the updated minimum quality of service level required by the second co-processor, determining and applying an adjustment to the power frequency supplied to the application processor, wherein the adjustment to the power frequency operates to optimize power consumption by the application processor.

2. The method of claim 1, wherein the power optimization measure comprises one or more of an adjustment to the power frequency supplied to the application processor, a transition of the application processor to a lower power mode, an adjustment to a rail current supplied to the application processor, and a transition of a subset of cores within the application processor to a lower power mode.

3. The method of claim 1, wherein determining the power optimization measure is based on at least one of an operational load of the application processor, an architecture of the application processor, and a frequency of the application processor.

4. The method of claim 1, wherein the determination of the updated minimum quality of service (QoS) level required by the co-processor is made during an application of a dynamic clock and voltage scaling (DCVS) algorithm to the co-processor.

5. The method of claim 1, wherein the determination of the power optimization measure for the application processor based on the determined updated minimum QoS level is made during an application of a second dynamic clock and voltage scaling (DCVS) algorithm to the application processor.

6. A system for providing dynamic quality of service levels in a multi-core on-chip system (SoC) in a portable computing device (PCD), the system comprising:
   a co-processor in communication with an application processor and dependent upon the application processor to process a workload at a power frequency sufficient to meet a minimum quality of service level required by the co-processor, the co-processor including a QoS module configured to:
   determine an operational load of the co-processor;
   recognize a change in the operational load of the co-processor; and
   based on the change in the operational load of the co-processor, determine an updated minimum quality of service (QoS) level required by the co-processor;
   communicate the updated minimum quality of service level to the application processor; the application processor including a QoS driver configured to:
   receive a communication of the determined updated minimum QoS level from the co-processor; and
   based on the updated minimum quality of service level required by the co-processor, determine and apply a power optimization measure to the application processor, wherein the power optimization measure operates to optimize power consumption by the application processor;
   a second co-processor of the SoC in communication with the application processor and dependent upon the application processor to process a second workload at a power frequency sufficient to meet a minimum quality of service level required by the second co-processor, the second co-processor including a second QoS module configured to:
   recognize a change in the operational load of the second co-processor
   based on the change in the operational load of the second co-processor, determine an updated minimum quality of service (QoS) level required by the second co-processor; and communicate the updated minimum quality of service level required by the second co-processor to the application processor; and wherein the QoS driver of the application processor is further configured to:
receive a communication of the updated minimum QoS level from the second co-processor; and
based on the updated minimum quality of service level required by the co-processor and the updated minimum quality of service level required by the second co-processor, determine and apply an adjustment to the power frequency supplied to the application processor, wherein the adjustment to the power frequency operates to optimize power consumption by the application processor.

7. The system of claim 6, wherein the power optimization measure comprises one or more of an adjustment to the power frequency supplied to the application processor, a transition of the application processor to a lower power mode, an adjustment to a rail current supplied to the application processor, and a transition of a subset of cores within the application processor to a lower power mode.

8. The system of claim 6, wherein the QoS driver of the application processor further configured to determine the power optimization measure based on at least one of an operational load of the application processor, an architecture of the application processor, and a frequency of the application processor.

9. The system of claim 6, wherein co-processor further comprises a dynamic clock and voltage scaling (DCVS) module in communication with the QoS module of the co-processor.

10. The system of claim 6, wherein the application processor further comprises a second dynamic clock and voltage scaling (DCVS) module in communication with the QoS driver of the application processor.

11. A computer program product comprising a non-transitory computer usable medium having a computer readable program code embodied therein, said computer readable program code adapted to be executed to implement a method for providing dynamic quality of service levels for an application processor in a multi-core on-chip system (SoC) in a portable computing device (PCD), the method comprising:
determining an operational load of a co-processor of the SoC, wherein the co-processor is in communication with the application processor and depends on the application processor to process a workload at a power frequency sufficient to meet a minimum quality of service level required by the co-processor;
recognizing a change in the operational load of the co-processor;
based on the change in the operational load of the co-processor, determining an updated minimum quality of service (QoS) level required by the co-processor;
communicating the updated minimum QoS level to the application processor; and
based on the updated minimum quality of service level required by the co-processor, determining and applying a power optimization measure to the application processor, wherein the power optimization measure operates to optimize power consumption by the application processor;
determining a second operational load of a second co-processor of the SoC, wherein the second co-processor is in communication with the application processor and depends on the application processor to process a second workload at a power frequency sufficient to meet a minimum quality of service level required by the second co-processor;
recognizing a change in the operational load of the second co-processor;
based on the change in the operational load of the second co-processor, determining an updated minimum quality of service (QoS) level required by the second co-processor;
communicating the updated minimum quality of service level required by the second co-processor to the application processor; and
based on the updated minimum quality of service level required by the co-processor and the updated minimum quality of service level required by the second co-processor, determining and applying an adjustment to the power frequency supplied to the application processor, wherein the adjustment to the power frequency operates to optimize power consumption by the application processor.

12. The computer program product of claim 11, wherein the power optimization measure comprises one or more of an adjustment to the power frequency supplied to the application processor, a transition of the application processor to a lower power mode, an adjustment to a rail current supplied to the application processor, and a transition of a subset of cores within the application processor to a lower power mode.

13. The computer program product of claim 11, wherein determining the power optimization measure is based on at least one of an operational load of the application processor, an architecture of the application processor, and a frequency of the application processor.

14. The computer program product of claim 11, wherein the determination of the updated minimum quality of service (QoS) level required by the co-processor is made during an application of a dynamic clock and voltage scaling (DCVS) algorithm to the co-processor.

15. A system for providing dynamic quality of service levels for an application processor in a multi-core on-chip system (SoC) in a portable computing device (PCD), the system comprising:
means for determining an operational load of a co-processor of the SoC, wherein the co-processor is in communication with the application processor and depends on the application processor to process a workload at a power frequency sufficient to meet a minimum quality of service level required by the co-processor;
means for recognizing a change in the operational load of the co-processor; means for, based on the change in the operational load of the co-processor, determining an updated minimum quality of service (QoS) level required by the co-processor;
means for communicating the updated minimum QoS level to the application processor;
means for, based on the updated minimum quality of service level required by the co-processor, determining and applying a power optimization measure to the application processor, wherein the power optimization measure operates to optimize power consumption by the application processor;
means for determining a second operational load of a second co-processor of the SoC, wherein the second co-processor is in communication with the application processor and depends on the application processor to process a second workload at a power frequency sufficient to meet a minimum quality of service level required by the second co-processor;

means for recognizing a change in the operational load of the second co-processor;

means for, based on the change in the operational load of the second co-processor, determining updated minimum quality of service (QoS) level required by the second co-processor;

means for communicating the updated minimum quality of service level required by the second co-processor to the application processor; and means for, based on the updated minimum quality of service level required by the co-processor and the updated minimum quality of service level required by the second co-processor, determining and applying an adjustment to the power frequency supplied to the application processor, wherein the adjustment to the power frequency operates to optimize power consumption by the application processor.

16. The system of claim 15, wherein the means for power optimization measure comprises means for one or more of an adjustment to the power frequency supplied to the application processor, a transition of the application processor to a lower power mode, an adjustment to a rail current supplied to the application processor, and a transition of a subset of cores within the application processor to a lower power mode.

17. The system of claim 15, wherein the means for determining the power optimization measure bases its determination on at least one of an operational load of the application processor, an architecture of the application processor, and a frequency of the application processor.

18. The system of claim 15, wherein the determination of the updated minimum quality of service (QoS) level required by the co-processor is made during an application of a dynamic clock and voltage scaling (DCVS) algorithm to the co-processor.

19. The system of claim 18, wherein the determination of the power optimization measure for the application processor based on the determined updated minimum QoS level is made during an application of a second dynamic clock and voltage scaling (DCVS) algorithm to the application processor.

* * * * *